United States Patent
Schwarzkopf et al.

[15] 3,644,163
[45] Feb. 22, 1972

[54] WELDING APPARATUS

[72] Inventors: August Schwarzkopf; Fritz Achelpohl, both of Westphalia, Germany

[73] Assignee: Windmoller & Holscher, Westphalia, Germany

[22] Filed: Sept. 10, 1969

[21] Appl. No.: 856,563

[30] Foreign Application Priority Data

Sept. 18, 1968  Germany ..................P 17 79 733.0

[52] U.S. Cl. ...........................156/583, 156/582, 156/164
[51] Int. Cl. .................................B32b 31/20, B30b 15/34
[58] Field of Search ..........................156/583, 582, 164

[56] References Cited

UNITED STATES PATENTS

| | | | |
|---|---|---|---|
| 2,579,063 | 12/1951 | Andrews | 15/583 |
| 3,081,212 | 3/1963 | Taylor, Jr. et al. | 156/164 |
| 3,108,034 | 10/1963 | Hannon | 156/583 X |
| 3,269,885 | 8/1966 | Cianci | 156/583 |

Primary Examiner—Benjamin A. Borchelt
Assistant Examiner—J. J. Devitt
Attorney—Fleit, Gipple & Jacobson

[57] ABSTRACT

Apparatus for forming a longitudinal seam in heat sealable layers of a traveling web of material comprising a rotatable guide roll extending longitudinally the width of the web to be sealed, the guide roll being provided on its periphery at one end with a striplike heating element, and a pressure roll to press the web against the heat element located where the web leaves the surface of the guide roll, the pressure roll longitudinally extending only over the region of the heating element.

9 Claims, 6 Drawing Figures

PATENTED FEB 22 1972 3,644,163

INVENTORS
August SCHWARZKOPF
Fritz ACHELPOHL
By

Fleit, Gipple & Jacobson
their ATTORNEYS

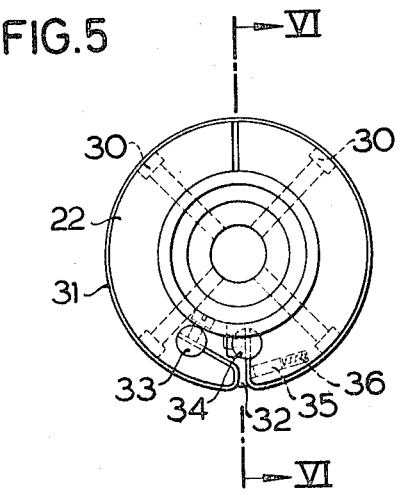
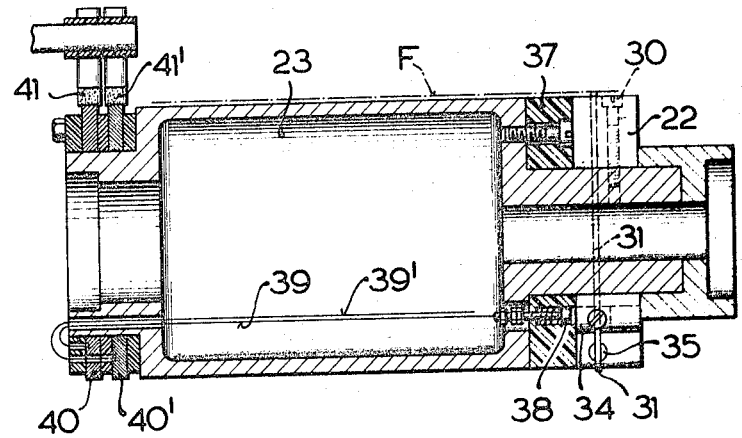

WELDING APPARATUS

The invention relates to welding apparatus, also known as heat-sealing apparatus, by means of which layers of thermoplastic foil material can be continuously joined to one another by a narrow welded or heat-sealed seam. Such welding apparatuses are useful, for example, to form the longitudinal seam of thin flattened tubing in the manufacture of plastics sacks, bags and filling valves. In this case, the purpose of the apparatus is to join the superposed free longitudinal edges of a web of thermoplastic foil that has been folded double or of a web comprising two separate superposed layers, the web being continuously moved past the welding apparatus to form the seam along the longitudinal edges.

Welding apparatuses for this purpose are already known. They are either of the kind where the welding heat is applied by radiation or of the kind where heating members come into contact with the web at the welding point and therefore transmit the welding heat by conduction. The former kind tend to heat a rather large area of the web and are therefore not suitable for forming narrow seams. With apparatuses of the latter kind, the width of the seam weld depends on the width of the heating member that comes into contact with the web and that moves at the same speed as the web.

The invention aims to provide a welding apparatus which permits uninterrupted and uniform heat transmission to the welding zone of the web to form either wide or very narrow seam welds.

According to the invention, apparatus for continuously seam welding a web of thermoplastic material comprises a peripherally heated heating roll about which the web can be passed and a pressure roll which is effective to press the web to the heating roll and which is disposed substantially in that region of the heating roll periphery where the web leaves the heating roll, the angle or arc of contact between the web and the heating roll preferably being adjustable.

In this way the web is maintained in contact with the heating roll periphery during a predetermined period, i.e., while it is looped around the heating roll. Heat is therefore transmitted to the welding zone during a period that is adaptable to the properties of the web material. The heating roll need be of a very little higher temperature than the welding or heat fusion temperature of the web, whilst the plastics material beyond the welding zone will not be unnecessarily heated. The uniform and intimate contact of the web where it is slung about the heating roll periphery ensures uninterrupted and uniform heat transmission to the welding zone and therefore uniform heating of both layers of the web at that place where the seam is to be formed. When the heated welding zone is then pressed to the heating roll by the pressure roll, the seam weld or heat seal is perfected under the combined action of the heating and pressure rolls. The entirely uniform heating of the welding zone along the arc of contact with the heating roll and the application of pressure by the pressure roll only after the welding zone has been heated to the optimum welding temperature facilitates the formation of a uniform and smooth seam weld which will not be spoiled by corrugations or crinkling in the adjoining areas of the web material, regardless of whether the seam weld is comparatively wide or extremely narrow such as less than 1 mm.

The welding apparatus takes up little space, not the least because the heating roll diameter can be kept small because the web makes arcuate contact with the heating roll.

To facilitate accurate guiding of the web during the welding process, the heating roll may be mounted on the shaft of a direction-changing drum for the web, the drum being of the same diameter as the heating roll so that the web is slung about the drum as well as the heating roll and is supported over its entire width as the welding zone is being heated.

The optimum welding temperature is set by regulating the temperature of the heating roll. Since different web materials of different thicknesses will require different amounts of heat to reach the welding or fusion temperature at a heating roll temperature which is as low as possible, the position of the pressure roll is preferably adjustable along the periphery of the heating roll. This permits alteration in the angle of contact of the web slung about the heating roll and therefore alteration of the time during which heat is conducted from the heating roll to the welding zone. Such alteration is possible within wide limits and the heating roll temperature can be kept to a minimum.

In one form of the invention, the position of the pressure roll along the periphery of the heating roll is adjusted automatically by means responsive to the production rate (rotary speed) of a machine to which the welding apparatus is to be fitted, so that the angle of contact of the web with the heating roll is increased upon an increase in the rotary speed of the machine, and vice versa. Such automatic control is possible, for example, with the aid of a mechanical centrifugal regulator and it permits the duration of heat transmission to the welding zone to be kept constant irrespective of the rotary speed of the machine so that faulty seam welds are automatically avoided even during the time when the machine is started and stopped or when the production rate is altered.

A suitable mounting for the pressure roll to permit adjustment of its position along the periphery of the heating roll may be a supporting arm that is pivotable about and securable to the shaft of the aforementioned direction-changing drum for the web. The pressure roll, as well as a guide roller for the web as it leaves the heating roll, are rotatably mounted on this supporting arm, either separately from one another or on a common shaft. In the case of automatic adjustment, the supporting arm will be linked to the aforementioned speed-responsive adjusting means, in which case the supporting arm will of course not be secured to the shaft of the direction-changing drum.

The heating roll may incorporate an electric heating coil in the interior and be tapered at the periphery to a width corresponding to the desired width of the seam weld. Although such a heating roll produces uninterrupted seam welds along the length of the web, it tends to radiate heat to adjoining portions of the web material that is slung about the heating roll. This is because considerable portions of the heating roll adjacent the tapered periphery will also be heated to the high welding temperature by the heating coil and, even though the web does not make contact with these adjacent portions, heat will be radiated thereby to parts of the web material adjoining the welding zone. In the case of webs of very thin foil this can prove disadvantageous by the formation of corrugations and crinkling adjacent the welding zone, thereby detrimentally affecting the appearance of the finished article. In addition, the heating roll constitutes a heat store which only sluggishly follows variations in the temperature of the heating coil, thereby making adjustment of the optimum heating temperature very difficult.

It is therefore preferred to use a heating roll comprising an electrically heatable annular metal strip which is seated on a supporting roller. The strip has the same width as the seam weld that is to be formed and makes contact with the web material, thereby avoiding heat radiation to parts of the web adjoining the welding zone because heat is transmitted only by conduction. In addition, the strip will store only very little heat and will therefore react quite rapidly to any changes in the heating current that is passed through it.

In a preferred form of the invention, the metal strip is applied to its supporting roller under tension and in the form of an open ring. The ends of the metal strip can extend into a radial recess of the supporting roller where they are connected to electric terminals and where a spring-influenced displaceable thrust member acts on the metal strip to hold the latter to the supporting roller under tension even if it becomes elongated because of thermal expansion. Such an arrangement is beneficial for very narrow heating strips that might otherwise become damaged. Of course the opening in the ring form of the metal strip will give rise to interruptions, i.e., gaps, in the resultant seam weld of the web material. In many cases this is not a disadvantage. For example, in the manufacture of valved bags from severed lengths of the web material, some of the material, including the longitudinal edges which have not been welded together because of the gaps, must be folded over to form a base closure for the bag and a gap in the seam weld is therefore unimportant or may even be advantageous for inserting the valve. However, if an uninterrupted seam weld is essential, a second like heating roll with an associated second like metal strip of open ring form can be provided downstream of the first heating roll and arranged to receive the web so that the gaps in the seam weld caused by the opening in the ring of the metal strip of the first heating roll are closed by the metal strip of the second heating roll.

Examples of the invention are illustrated in the accompanying diagrammatic drawings, wherein:

FIG. 5 is an enlarged end view of the heating roll of the FIGS. 3 and 4 apparatus, and FIG. 6 is a section taken on the line V—V of the FIG. 5 heating roll and of the associated direction-changing drum of the FIGS. 3 and 4 apparatus.

Figure 1:
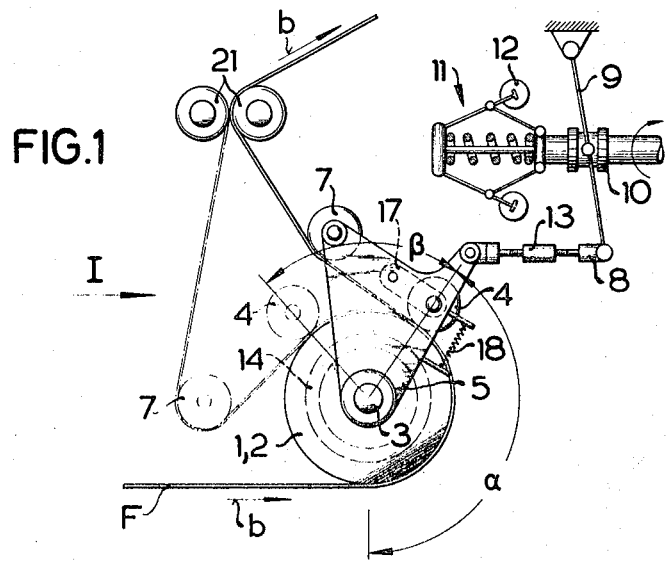
FIG. 1 is a side elevation of a welding apparatus employing an internally heated heating roll.
Figure 2:
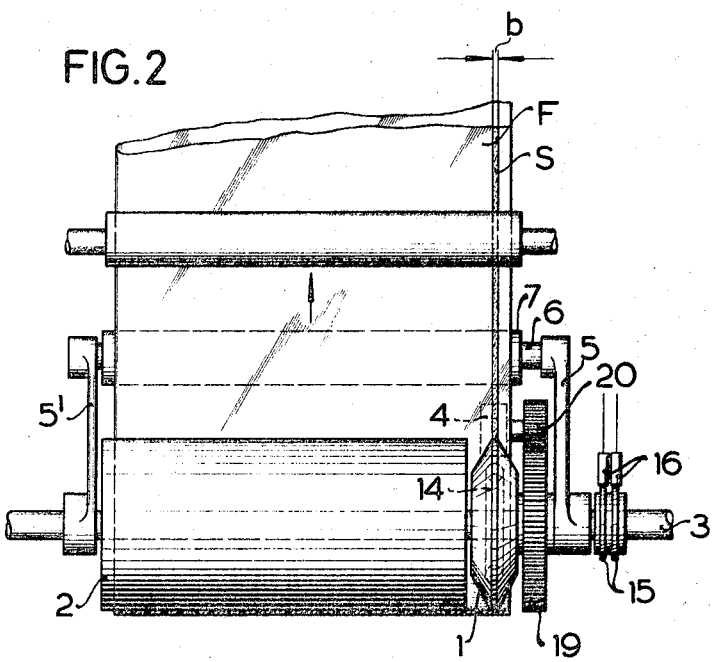
FIG. 2 is a fragmentary view taken in the direction of the arrow I in FIG. 1.
Figure 4:
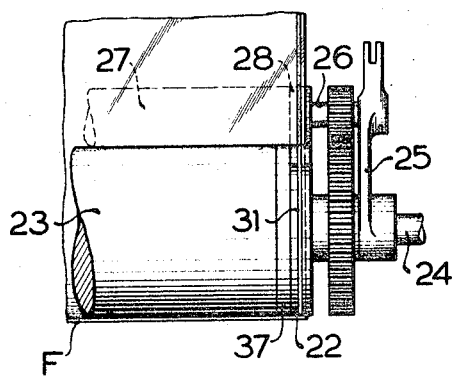
FIG. 4 is a fragmentary elevation taken in the direction of the arrow III in FIG. 3.

Referring to FIGS. 1 and 2, the welding apparatus comprises a peripherally heated heating roll 1 which, together with a direction-changing drum 2 for a web F of foil material that has been folded double, is seated on a shaft 3 that is mounted in a frame of the apparatus. Instead of being folded as illustrated, the web F may comprise two superposed separate layers of thermoplastic foil. A pressure roll 4 located in the same general plane as the heating roll is mounted on a supporting arm 5 and the two rolls are located in the path of the web F so that the latter will be slung about the heating roll 1 and make contact therewith over an angle $\alpha$. The pressure roll 4 is disposed substantially in that region of the heating roll periphery where the web leaves the heating roll again. The purpose of the welding apparatus is to produce a continuous narrow seam weld S along the superposed longitudinal edges of the web layers and thus to interconnect the layers to form a flattened tube. The part of the web that is to be welded passes between the heating roll 1 and pressure roll 4. The supporting arm 5 is pivotably mounted on the shaft 3 and, by means of a crossbar 6 of circular section, is connected to a supporting arm 5' that is pivoted to the shaft 3 at the other side of the direction-changing drum 2. The crossbar 6 carries a rotatable guide roller 7 for the web, the guide roller being arranged so that its periphery contacts the web at the common tangent of the heating and pressure rolls. The supporting arms 5, 5' together with the pressure roll 4 and guide roller 7 carried thereby, are tiltable about the shaft 3 through an angle $\beta$. Thus, by tilting the supporting arms 5, 5' it is possible to vary the angle of contact $\alpha$ and thereby the period during which the web F is heated by the heating roll 1. During this time the web is accurately guided by the drum 2 and the guide roller 7, the latter ensuring that in all angular positions of the supporting arms 5, 5' the web will leave the heating roll 1 at the point where the pressure roll 4 makes contact with the heating roll 1.

The supporting arms 5, 5' can be swung by hand to a position which will result in the optimum welding period for the web material that is being used and then locked in this position by a set screw (not shown). Alternatively, the arrangement shown in FIG. 1 can be used where the supporting arms 5, 5' are linked by means of a drawbar 8 and a lever 9 to the setting element 10 of a centrifugal regulator 11 which is driven at a rotary speed that depends on the speed of a machine to which the welding apparatus is to be fitted. The arrangement of the linkage 8, 9 is such that the angle of contact $\alpha$ will be increased when the machine speed and thus the displacement of flyweights 12 of the regulator increases, and vice versa. The maximum angle of contact in FIG. 1 is $\alpha+\beta$ and occurs when the supporting arms 5, 5' have been swung through their full angle $\beta$, the positions of the pressure roll 4 and guide roller 7 in this condition being shown in chain-dotted lines.

The drawbar 8 comprises two rods provided with respective right-hand and left-hand screw threads engaging in a correspondingly screw-threaded sleeve 13. By turning the sleeve the length of the drawbar 8 and thus the range of positions of the supporting arms 5, 5' can be changed in relation to the heating roll 1. For example, by extending the drawbar 8 the entire angular adjustment range $\beta$ is displaced counterclockwise relatively to the heating roll 1, thereby permitting a corresponding increase in the maximum angle of contact between the web and the heating roll to increase the heating period for, say, processing webs of thicker foil material.

The heating roll 1 is of heat-conductive metal and has an electric heating coil 14 in its interior. The heating current is supplied to the coil 14 through sliprings 15 and brushes 16. At the periphery, the heating roll is tapered down to a width corresponding to the desired width $b$ of the seam weld S. The diameter of the heating roll is preferably accurately equal to the diameter of the direction-changing drum 2. The pressure roll 4 may be of, or be covered with, elastic material so that it will lie snugly against the heating roll 1. The pressure roll 4 could also be of a hard material and, as indicated in FIG. 1, be carried at the end of a swing arm which is pivoted to the supporting arm 5 at 17. A spring 18 urges the roll 4 into contact with the heating roll periphery and the pressure roll may also be coupled to the heating roll through gears 19 and 20.

The heating roll 1, direction-changing drum 2 and pressure roll 4 can be driven at a speed complementary to the speed at which the web F is being fed or they may freewheel and be frictionally turned under the action of the advancing web. The web is fed in the direction of the arrow $b$ in FIG. 1 by a pair of feed rollers 21 and is slung about the direction-changing drum 2 and heating roll 1 to make an angle of contact $\alpha$ with the heating roll, the web being guided by the roller 7 so that it leaves the heating roll again at the instant of the seam weld S having been formed under the pressure of the pressure roll 4 after the welding zone has been heated to the required welding temperature whilst the web was making contact with the heating roll over the angle $\alpha$. By adjusting the supporting arms 5, 5' and hence the pressure roll 4 within the range of the angle $\beta$, the angle of contact $\alpha$ can be set so that the welding zone of the web reaches the proper welding temperature. With automatic control of the supporting arms 5, 5' by the centrifugal regulator 11 and with the aid of the sleeve 13, the optimum angle of contact for a machine that is running at normal speed will be $\alpha+\beta$. As the machine speed gradually increases from standstill, the regulator will gradually increase the angle of contact from $\alpha$ to $\alpha+\beta$ whilst during deceleration of the machine the angle of contact will gradually be reduced to $\alpha$ again. By suitable choice of the transmission ratio of the lever 9 it is possible to ensure that the absolute time during which the web is in contact with the heating roll over the variable angle $\alpha$ remains constant, whereby the heating period will also be constant. This avoids the production of faulty seam welds during starting and stopping of the machine or when the machine is set to provide a different production rate.

The welding apparatus of FIGS. 3 to 6 has a heating roll construction and mounting for the direction-changing drum different from those described for FIGS. 1 and 2. As shown in FIGS. 3 and 4, there is again a heating roll 22 and direction-changing drum 23 mounted on a common shaft 24. The shaft 24 also carries two pivotable supporting arms 25, of which only one is visible in FIG. 4. A crossbar 26 which interconnects the supporting arms 25 forms a shaft for a guide roller 27 and an adjacent pressure roll 28 which is mounted in the same general plane as the heating roll 22. The guide roller 27 and pressure roll 28 have the same diameter and bear on the periphery of the direction-changing drum 23 and heating roll 22, respectively. As in the case of FIGS. 1 and 2, the supporting arms 25 are set to produce the desired angle $\beta$ either by hand or by means of a drawbar 29 which is connected to means (not shown) responsive to the rotary speed of a machine to which the welding apparatus is to be fitted for automatically adjusting the position of the pressure roll along the periphery of the heating roll. Depending on the angular setting within the range β, the guide roller 27 and pressure roll 28 determine the size of the angle of contact α subtended by the foil F that is slung about the heating roll 22 and direction-changing drum 23.

Referring to FIGS. 5 and 6, the heating roll 22 is seated on a reduced section or boss of the direction-changing drum 23. It is preferably made in two parts, consists of heat-resistant electrical insulating material such as an asbestos cement and is secured to the boss by means of screws 30. The heating roll has the same diameter as the direction-changing drum 23 and, in a peripheral groove, carries a heating strip 31 of metal having a high electrical resistance and arranged in the form of an open ring, the ends of which extend into a radial recess 32 where they are connected to electrical terminals 33 and 34. In a hole leading from the recess 32, there is a displaceable thrust member 35 which, under the action of a spring 36, bears on the inner face of the heating strip. The thrust member 35 therefore holds the strip 31 to the heating roll under tension. It ensures that the strip will make intimate contact with the heating roll even if it becomes elongated under thermal expansion. This construction of the heating strip in the form of an open ring under tension also permits the use of very small cross sections for the heating strip, particularly very small widths for the strip, because the strip will always lie snugly against the heating roll. The strip is flush with the heating roll periphery or projects therebeyond by only fractions of a millimeter so that the web will be sure to make contact with the heating strip. To avoid the web from sticking to the hot strip, the surface of the latter may be provided with a coating or covering of Teflon.

Between the heating roll 22 and a shoulder on the direction-changing drum 23 there is an insulating disc 37 carrying two terminals or connectors 33, 34 which lie opposite intermediate contacts 38. Each of the intermediate contacts (only one is visible in FIG. 5) is connected to a respective slipring 40, 40' by means of a respective conductor 39, 39', electric current being supplied to the sliprings by respective brushes 41, 41'. When the heating roll 22 is mounted on the boss of the direction-changing drum 23, the intermediate contacts 38 are spring-biased into contact with the terminals 33, 34 of the heating roll and therefore provides an electric connection to the sliprings.

Figure 3:
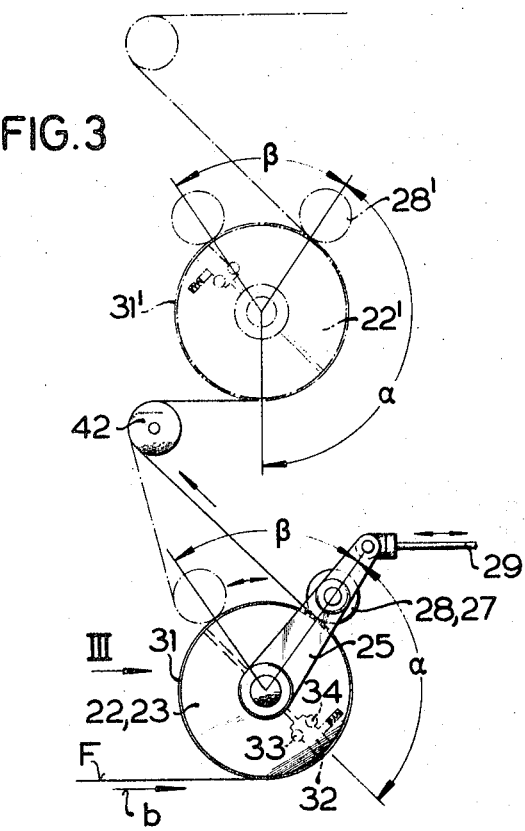
FIG. 3 is a side elevation of a different welding apparatus employing a heating roll which comprises a metal strip seated on a supporting roller.

The opening in the ring formation of the heating strip 31, that is to say the width of the radial recess 32, gives rise to interruptions or gaps in the seam weld produced in the web by the heating roll 22. If an uninterrupted seam weld is to be produced in the web material then, as indicated in FIG. 3, a second heating roll 22' is provided downstream of the heating roll 22. The second heating roll and the parts associated with it may be exactly the same as the roll 22 and its associated parts but it is arranged so that its heating strip 31' will close the gaps in the seam weld formed by the heating roll 22. By appropriate adjustment of the angle β for the second heating roll, the same angle of contact α should be set as for the first heating roll 22 so that the same heating periods will obtain for both heating rolls. The renewed heating caused by the roll 22' of the web parts that were previously heated by the roll 22 and finally welded by the pressure roll 28 will not be detrimental because the previously formed seam weld will have cooled before it reaches the roll 22' via a guide roller 42 and the efficiency of the previously formed weld will not be affected.

We claim:

1. Apparatus for continuously making longitudinal heat-sealed seams for uniting at least two layers of thermoplastic material, comprising means to move said layers along a predetermined path of travel, at least one rotatable guide roll for said layers the axial length of which is at least equal to the width of said layers, said guide roll comprising at least at one end thereof a striplike heating element extending around the periphery of said guide roll, and a pressure roll disposed in the region of said guide roll where said layers leave the latter, said pressure roll being adjustable along the periphery of said guide roll, the axial length of said pressure roll being such that said pressure roll substantially covers only the region of said heating element.

2. Apparatus according to claim 1, including means responsive to the rotary speed of a machine to which the apparatus is to be fitted for automatically adjusting the position of the pressure roll along the periphery of said guide roll so that the angle of contact of the layers with said guide roll is increased upon an increase in the rotary speed of the machine, and vice versa.

3. Apparatus according to claim 1, wherein the pressure roll and a further guide roll for the layers are mounted on a supporting arm that is pivotable about and securable to the shaft of said guide roll.

4. Apparatus according to claim 2, wherein the pressure roll and a further guide roll for the layers are mounted on a supporting arm that is pivotable about the shaft of said guide roll and that is linked to the speed-responsive automatic adjusting means.

5. Apparatus according to claim 3, wherein the pressure roll is mounted on a shaft of said further guide roll.

6. Apparatus according to claim 1, wherein said heating element comprises an electrically heatable metal strip seated on a supporting roller.

7. Apparatus according to claim 6, wherein the metal strip is applied to the supporting roller under tension in the form of an open ring.

8. Apparatus according to claim 7, including a second guide roll associated with a second metal strip of open ring form and arranged to receive the layers after they have left the first guide roll so that gaps in the heat-sealed seam caused by the opening in the ring of the metal strip of the first guide roll are closed by the metal strip of the second guide roll.

9. Apparatus according to claim 7, wherein the ends of the metal strip extend into a radial recess of the supporting roller and are connected to electric terminals, and further comprising a spring-influenced displaceable thrust member provided in the supporting roll to act on the metal strip in the said recess and hold the strip to the supporting roller under tension.

* * * * *